(12) United States Patent
Lissotschenko et al.

(10) Patent No.: US 6,471,372 B1
(45) Date of Patent: Oct. 29, 2002

(54) ASSEMBLY AND DEVICE FOR OPTICAL BEAM TRANSFORMATION

(76) Inventors: Vitalij Lissotschenko, Tospelliweg 19, Dortmund D-44149 (DE); Alexei Mikhailov, Am Spörkel 67, Dortmund D-44227 (DE)

( * ) Notice: Subject to any disclaimer, the term of this patent is extended or adjusted under 35 U.S.C. 154(b) by 0 days.

(21) Appl. No.: 09/429,806

(22) Filed: Oct. 29, 1999

(30) Foreign Application Priority Data

Oct. 30, 1998 (DE) .......................... 198 50 287
Oct. 30, 1998 (DE) .......................... 199 20 293

(51) Int. Cl.$^7$ ................................. F21V 5/00
(52) U.S. Cl. ................. 362/268; 362/333; 362/335; 362/555
(58) Field of Search ............... 362/555, 551, 362/553, 268, 335, 338, 333; 385/33

(56) References Cited

U.S. PATENT DOCUMENTS

| | | | |
|---|---|---|---|
| 5,168,401 A | 12/1992 | Endiz | |
| 5,243,619 A | 9/1993 | Albers et al. | |
| 5,418,880 A | * 5/1995 | Lewis et al. | 385/123 |
| 5,513,201 A | 4/1996 | Yamaguchi et al. | |
| 5,592,333 A | * 1/1997 | Lewis | 385/123 X |

FOREIGN PATENT DOCUMENTS

| | | |
|---|---|---|
| WO | WO96/04584 A | 2/1996 |
| WO | WO96/04701 A | 2/1996 |

OTHER PUBLICATIONS

EP Search Report EP 99 12 0248.

* cited by examiner

Primary Examiner—Stephen Husar
(74) Attorney, Agent, or Firm—Scott J. Asmus; Maine & Asmus (57) ABSTRACT

Assembly for optical beam transformation, which is useful for imaging a light source (1) or several light sources onto the front face of an optical fiber (7), comprising at least one light source (1) that is capable of emitting at least one beam of light (9) and further comprising one imaging element (2) and at least one device (3) for optical beam transformation, the imaging element (2) being able to image the at least one beam of light (9) emitted from the at least one light source onto the at least one device (3) for optical beam transformation through which the at least one beam of light can at least partially pass and the at least one device (3) for optical beam transformation being able to rotate the at least one beam of light (9) passing through said device at least in sections about the direction of propagation (z) of the respective section of the beam(s) of light by an angle of about 90°, the device (3) for optical beam transformation comprising at least one segment of cylindrical lens (8) on one entry and/or exit plane of the beam(s) of light (9).

7 Claims, 10 Drawing Sheets

ASSEMBLY AND DEVICE FOR OPTICAL BEAM TRANSFORMATION

The present invention relates to an assembly and a device for optical beam transformation, in particular an assembly, which is useful for imaging a light source or several light sources onto the front face of an optical fiber, comprising at least one light source that is capable of emitting at least one beam of light and further comprising one imaging element and at least one device for optical beam transformation, the imaging element being able to image the at least one beam of light emitted from the at least one light source onto the at least one device for optical beam transformation, through which the at least one beam of light can at least partially pass, the at least one device for optical beam transformation being able to rotate the beam of light passing through said device at least in sections about the direction of propagation of the respective section of the beam or beams of light by an angle of about 90°.

An assembly and a device of the aforementioned type are known from the European Patent Specification EP 0 484 276 B1. In the assembly described therein the light from several diode lasers arranged in a row is focussed onto the front face of an optical fiber. Instead of several diode lasers the light from a laser diode bar with several linear light-emitting sections arranged in a row may also be imaged onto the front face of the optical fiber. In the mentioned patent specification one Abbé-König-prism per partial beam of one of the diode lasers serves as device for optical beam transformation. Each of these beams of light, having an essentially linear cross-section, is rotated in each of these Abbé-König-prisms by approximately 90°. Such a rotation of beams of light originating from linear light sources arranged in a row has been found to be useful, especially because an effective imaging of the individual partial beams upon the front face of the optical fiber with simple means may be rendered impossible because of interpenetration of the individual partial beams due to divergence of the individual partial beams in the direction of the longitudinal extension of the light source. The use of an Abbé-König prism to rotate the individual partial beams turns out to be disadvantageous however, because for one thing the Abbé-König prism is an expensive optical component with a very complex design. For another, the individual partial beams must be fed separated from each other into a considerable number of adjacent separate Abbé-König prisms. Due to the required separation into individual partial beams or bundles of partial beams the light from a two-dimensionally extended light source cannot be effectively imaged into a given section of space and in particular cannot or can only far from completely be rotated in segments or sections with the previously known device.

The object of the present invention is the creation of an assembly for optical beam transformation of the initially mentioned kind and a device for optical beam transformation of the initially mentioned kind which are simpler and cheaper to manufacture and can be used more effectively.

According to the invention this is achieved by an assembly with the elements of and a device with the elements of. According to the invention the at least one entry plane and/or the at least one exit plane of the device for optical beam transformation comprises at least one segment of cylindrical lens. With such a device, light emitted from light sources in the form of a point, of groups of points, or from linear or two-dimensionally extended light sources can be rotated, in particular rotated in segments.

In one embodiment of the assembly according to the invention the cylinder axis of the at least one segment of cylindrical lens may be inclined within the plane of the entry and/or exit plane with respect to the longitudinal direction of the substantially linear or rectangular cross-section of an incident beam of light, preferably by an angle of about 45°. In particular, at an inclination of the cylinder axis of about 45° the incident beam of light is rotated by about 90° in its entirety or in segments. The at least one entry and/or exit plane may have a substantially elongated, preferably a rectangular form, in which case the cylinder axis of the at least one segment of cylindrical lens will be inclined within this plane by an angle of preferably 45° with respect to the longitudinal direction of the plane.

It is advantageous for both the at least one entry plane and the at least one exit plane to comprise segments of cylindrical lens that are arranged facing each other in the central direction of propagation of the beams of light that are incident upon the device. Preferably the at least one entry plane and the at least one exit plane each comprise a number of segments of cylindrical lens of identical focal length that are arranged next to each other and in parallel to each other. This arrangement ensures that beams of light emitted by a two-dimensionally extended light source enter the device through segments of cylindrical lens arranged next to each other and exit through the facing segments of cylindrical lens, with all partial beams passing through the device being rotated or deflected, respectively, in an analogous way because of the identical focal length of all segments of cylindrical lens.

According to an alternative preferred embodiment the at least one entry plane and/or the at least one exit plane are provided with a number of segments of cylindrical lens, advantageously having identical focal lengths, which are arranged next to each other, with adjacent segments being at an angle, preferably a right angle, to each other. When the light from a two-dimensionally extended light source falls upon two adjacent segments of cylindrical lens that are oriented at right angles to each other, the respective sections of the beam of light incident upon these segments are rotated by +90° and −90°, respectively, in passing through the device. By choosing the point of rotation in an advantageous way, the sections of the beam of light incident upon adjacent segments of cylindrical lens that are oriented at right angles to each other are folded towards each other in such a way that after passing through the device the distance between them is reduced to zero. As a particular result the extension of the two-dimensionally extended incident beam of light is halved in one direction and doubled in the other direction. Particularly in the case of light sources that are more extended in the one than in the other direction this amounts to a balancing of the beam quality product. Hence this embodiment is particularly suitable for focussing the light emitted by a multimode laser diode onto an optical fiber.

According to a preferred embodiment of the present invention the device is provided as a substantially cuboid body, having one entry plane and one exit plane which are parallel to each other and the distance between which preferably corresponds to twice the focal length of the segments of cylindrical lens. The parallel arrangement of entry and exit plane assures that beams of light maintain their direction after their passage through the device. Choosing the distance between entry and exit plane to be equal to twice the focal length of the segments of cylindrical lens ensures that beams of light undergo only rotation but not focussing or expansion when passing through the device.

According to an alternative preferred embodiment of the present invention the device consists of two substantially cuboid bodies, each of which comprises an entry plane and an exit plane parallel to said entry plane, the distance between the two planes preferably being smaller than the single focal length of the segments of cylindrical lens. These two cuboid bodies are preferably arranged with respect to each other in such a way, that the cylindrical lenses, formed by segments of cylindrical lens facing each other in each one of the two bodies, have a common focal plane between the cuboid bodies. One effect of this arrangement is to ensure that beams of light passing through the device will undergo only rotation and not focussing or expansion. Moreover, due to focussing of beams of light passing through the device into the common focal plane between the cuboid bodies, light sources with a greater divergence in one direction or light sources with emitting sections positioned close to each other in one direction can be handled more effectively as well, allowing a reduction of losses in imaging, for example onto the front face of an optical fiber.

Additional advantages and features of the present invention will become apparent from the following description of preferred embodiments with reference to the appended drawings, in which:

FIG. 1b is a side view of the arrangement according to FIG. 1a;

FIG. 2b is a schematic section along the line FIG. 2b in FIG. 2a;

FIG. 2c is a perspective view depicting the cuboid structure of the lenses of FIG. 2a.

FIG. 4b is a schematic section along the line FIG. 4b in FIG. 4a;

FIG. 4c is a perspective view depicting two cuboid structures of the lenses of FIG. 4a.

FIG. 5b is a plan view of the exit plane of a device according to FIG. 5a;

FIG. 6b is a plan view of the exit plane of the device according to FIG. 6a.

Figure 1A:
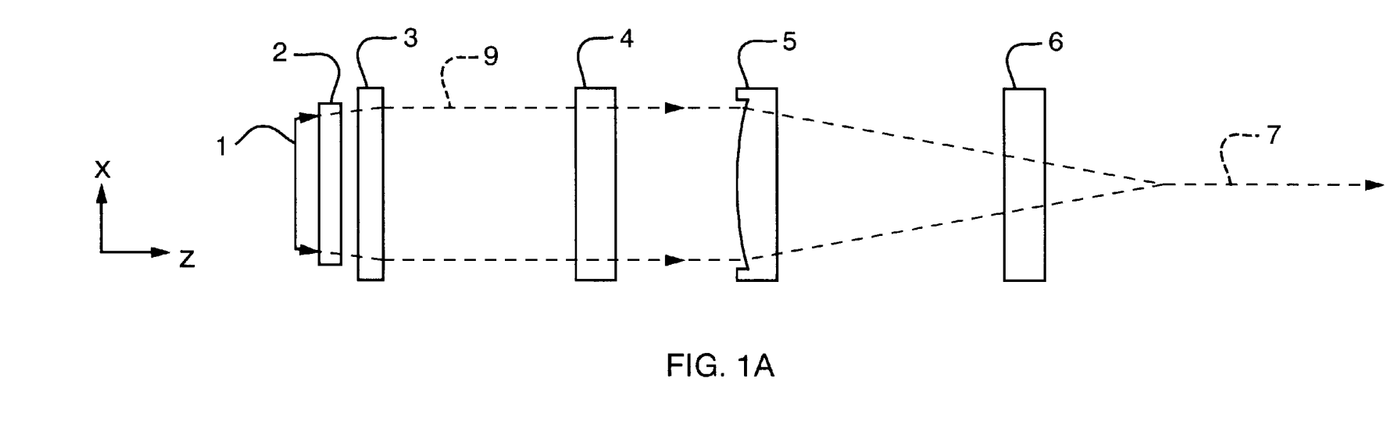
FIG. 1a is a plan view of an arrangement for optical beam transformation according to the invention.
Figure 1B:
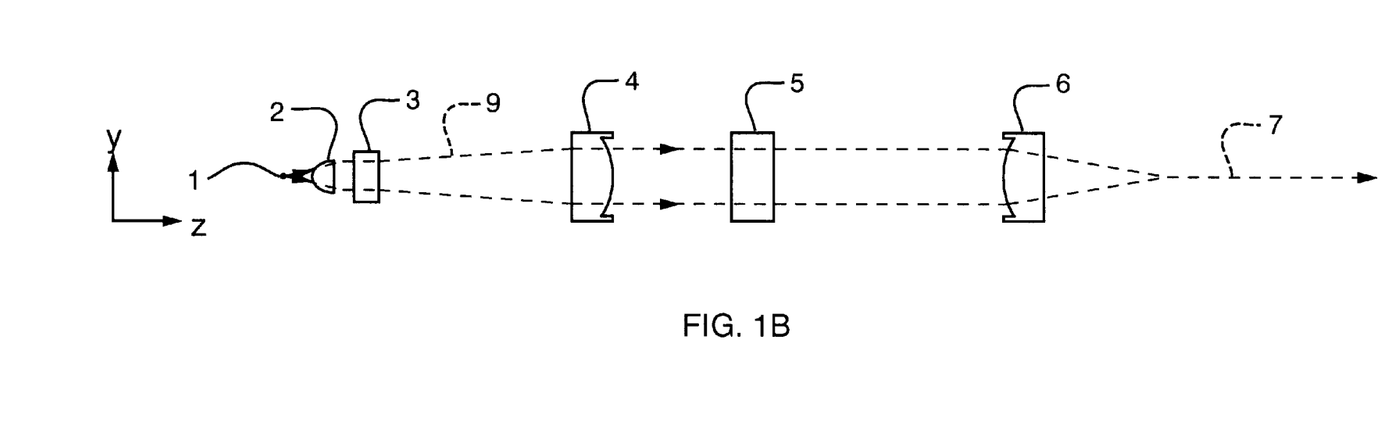

The arrangement for optical beam transformation shown in FIG. 1a and FIG. 1b comprises a light source 1 provided as a laser diode bar and representing a substantially linear light source. Instead of a linear light source a point light source or a light source consisting of groups of point sources or a two-dimensionally extended light source with an arbitrary angular distribution can be used as well. Co-ordinate axes x, y and z have been drawn in FIG. 1a and FIG. 1b for better orientation. In this example light source 1 extends mainly in the x-direction in which it has for example an extension of 10 mm. In contrast in y-direction the light source 1 has an extension of approximately 1 $\mu$m. Light emitted from light source 1 has a substantially greater divergence in the direction of the y-axis than in the direction of the x-axis. The divergence in y-direction is about 0.5 rad, whereas the divergence in x-direction is about 0,1 rad. Furthermore, light source 1, for example provided as a laser diode bar, is divided in x-direction into several light-emitting sections, for example into 20 to 25 sections in it's longitudinal extension.

In a cylindrical lens 2, extending substantially in x-direction, the light emitted by light source 1 undergoes diffraction-limited collimation in a cylindrical lens 2 in such a way that the divergence in y-direction is no more than 0.005 rad, such that the light 9 behind the cylindrical lens 2 propagates substantially parallel to the y-axis.

In the device 3 for optical beam transformation, to be described in more detail below, incident light 9 is rotated by an angle of 90°, such that after leaving device 3 the divergence in y-direction is approximately 0.1 rad and its divergence in x-direction is approximately 0.005 rad. Such a beam with negligible divergence in x-direction and moderate divergence in y-direction can readily be focused onto the end of an optical fiber 7 and coupled into the same by focussing elements 4, 5, 6, which can for example be provided in the form of cylindrical lenses.

Figure 2A:
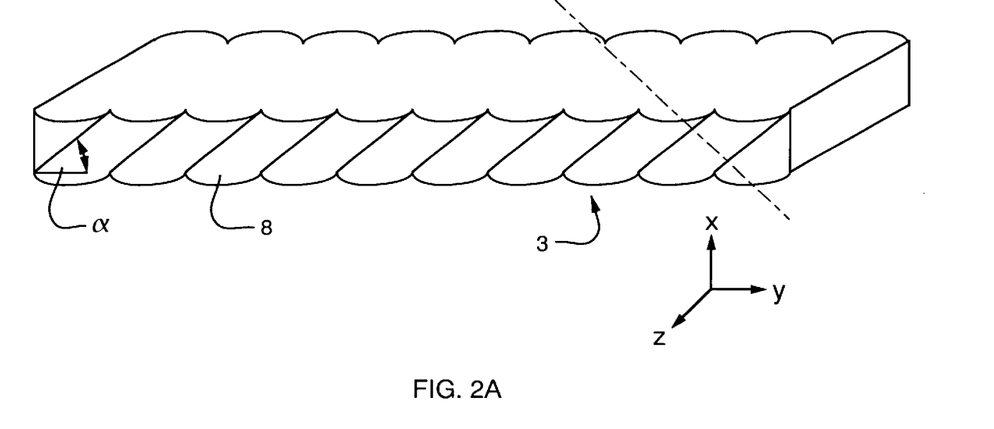
FIG. 2a is a perspective view of a device for optical beam transformation according to the invention.
Figure 2B:
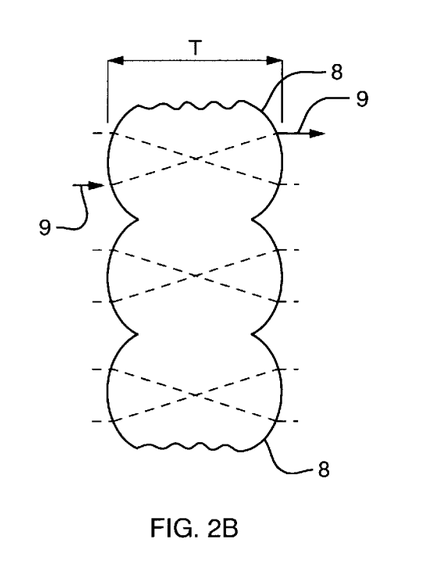
Figure 2C:
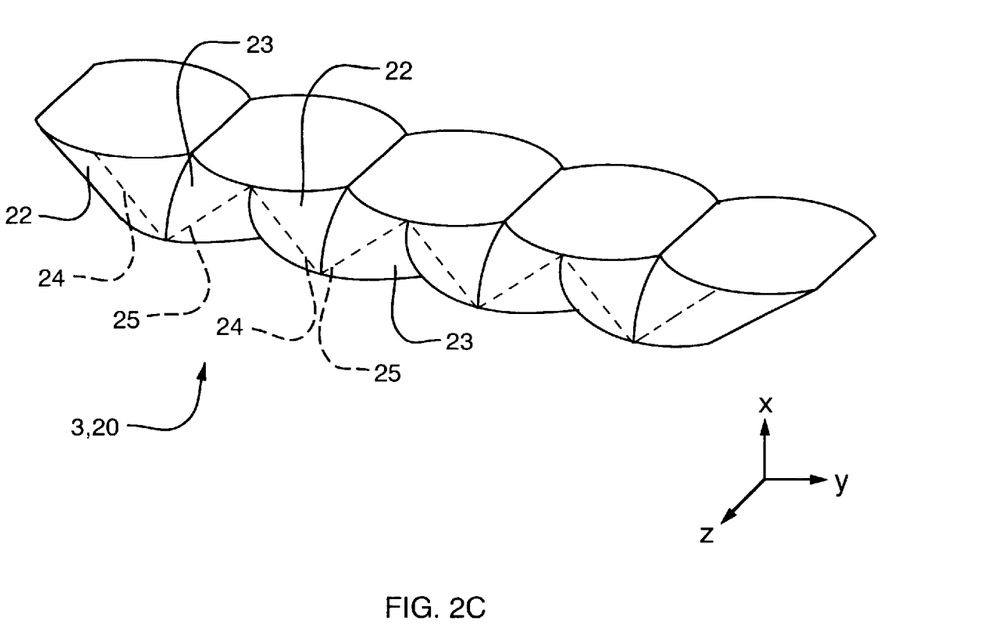

FIG. 2a, FIG. 2b and FIG. 2c show an embodiment of a device 3 for optical beam transformation according to the invention. It consists of a substantially cuboid block of a transparent material, on the entry side and the exit side of which a whole number of segments of cylindrical lens 8 are arranged in parallel to each other. The axes of the segments of cylindrical lens 8 form an angle $\alpha$ of 45° with the base side of the cuboid device, which extends in x-direction. In the depicted example for the embodiment approximately ten segments of cylindrical lens are arranged next to each other on each of the two x-y-planes of device 3. FIG. 2b shows that the thickness T, measured in z-direction, of the biconvex cylindrical lenses formed by the array of cylindrical lenses is equal to twice the focal length of each of these biconvex cylindrical lenses. This corresponds to $$T=2F_n$$

Here T is the thickness of device 3 for optical beam transformation provided as an array of cylindrical lenses and $F_n$ is the focal length of each of the biconvex cylindrical lenses for a refractive index n of the material selected for device 3. FIG. 2b shows a schematic beam path 9, which illustrates that each of the biconvex cylindrical lenses transforms a parallel beam of light into another parallel beam of light.

Figure 3:
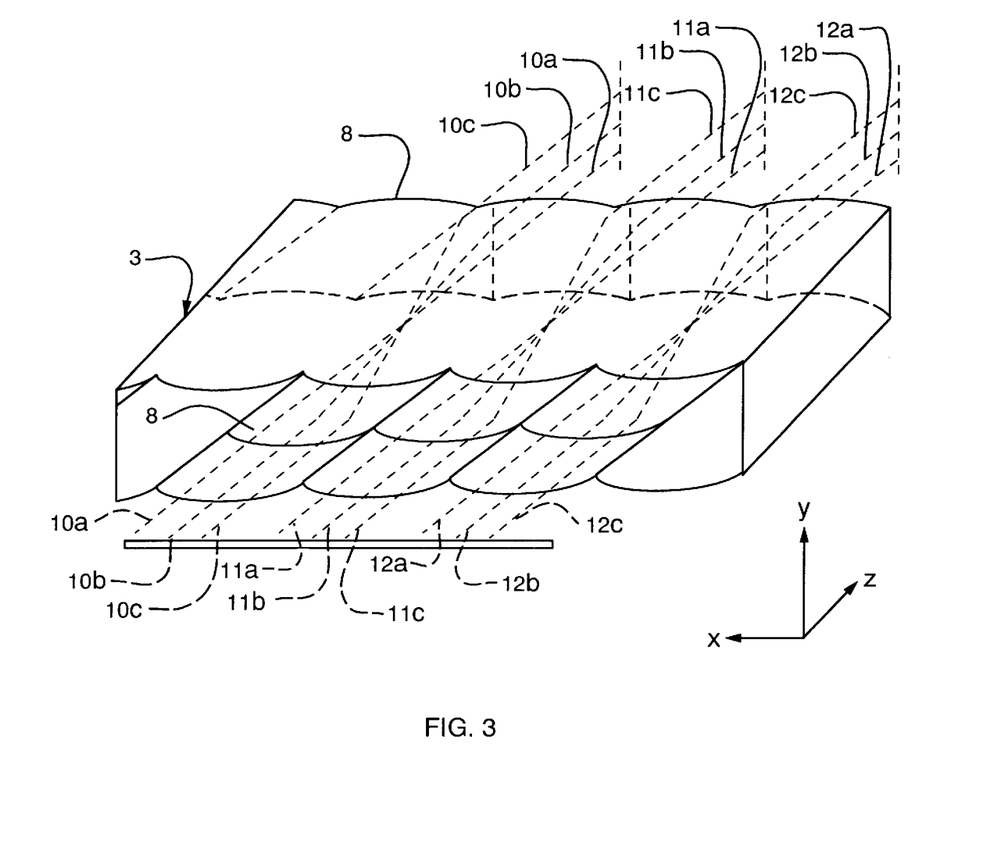
FIG. 3 is a perspective view of a device for optical beam transformation according to the invention with three exemplary beams.

FIG. 3, using as examples partial beams 10a, b, c, 11a, b, c, 12a, b, c, illustrates the passage through a device 3 according to the invention of a beam of light that is incident upon device 3 with a linear cross-section. For the sake of simplicity, partial beams 10, 11, 12 have been represented as though the beam of light was exclusively extended in x-direction. Device 3 is arranged facing the partial beams according to the arrangement in FIG. 1, i.e. the optically active surfaces provided with the segments of cylindrical lens 8 are x-y-planes.

FIG. 3 shows that partial beams 10, 11, 12 undergo a rotation by 90° when passing through device 3, so that the individual partial beams 10, 11, 12 are extended exclusively in y-direction after their passage through device 3. For example, light ray 10b passes unhindered through device 3, whereas light ray 10a, incident upon the entry plane to its left, is deflected towards the center and downwards and light ray 10c, incident upon the entry plane to its right, is deflected towards the center and upward. The same is true for the partial beams 11 and 12. In this way a potential overlap of partial beams 10, 11, 12, which could for example emerge from separate individual sections of light source 1, due to a possibly relatively high divergence in x-direction before entering device 3, can be avoided. This is because after the passage through device 3 only a diffraction-limited residual divergence is present in x-direction, whereas the divergence in y-direction corresponds to the original divergence in x-direction of for example 0.1 rad.

Figure 4A:
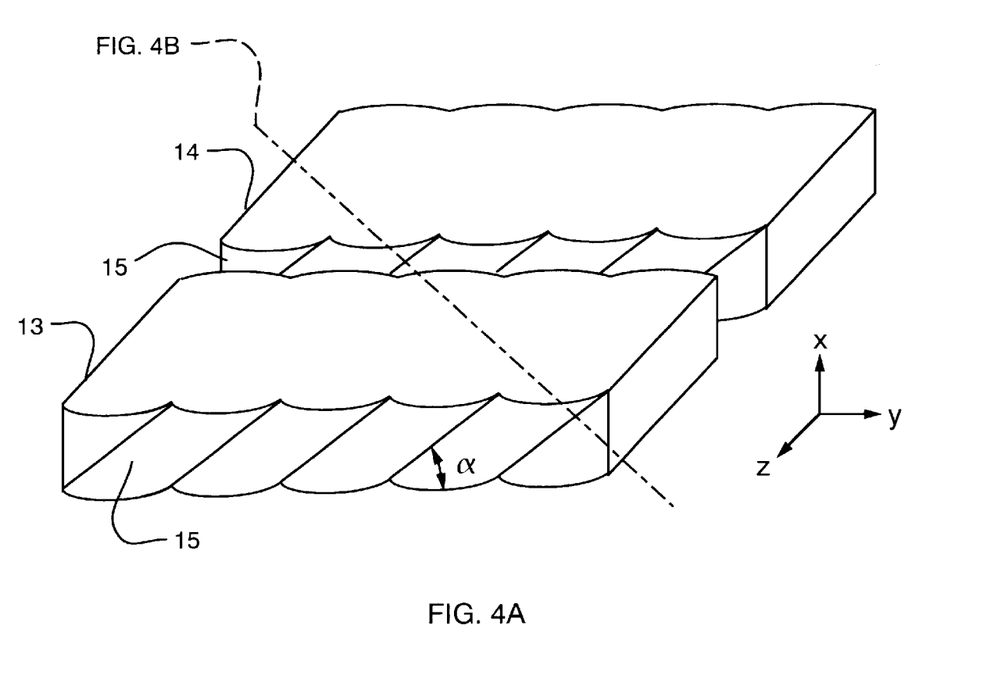
FIG. 4a is a schematic view of another embodiment of a device for optical beam transformation according to the invention.
Figure 4B:
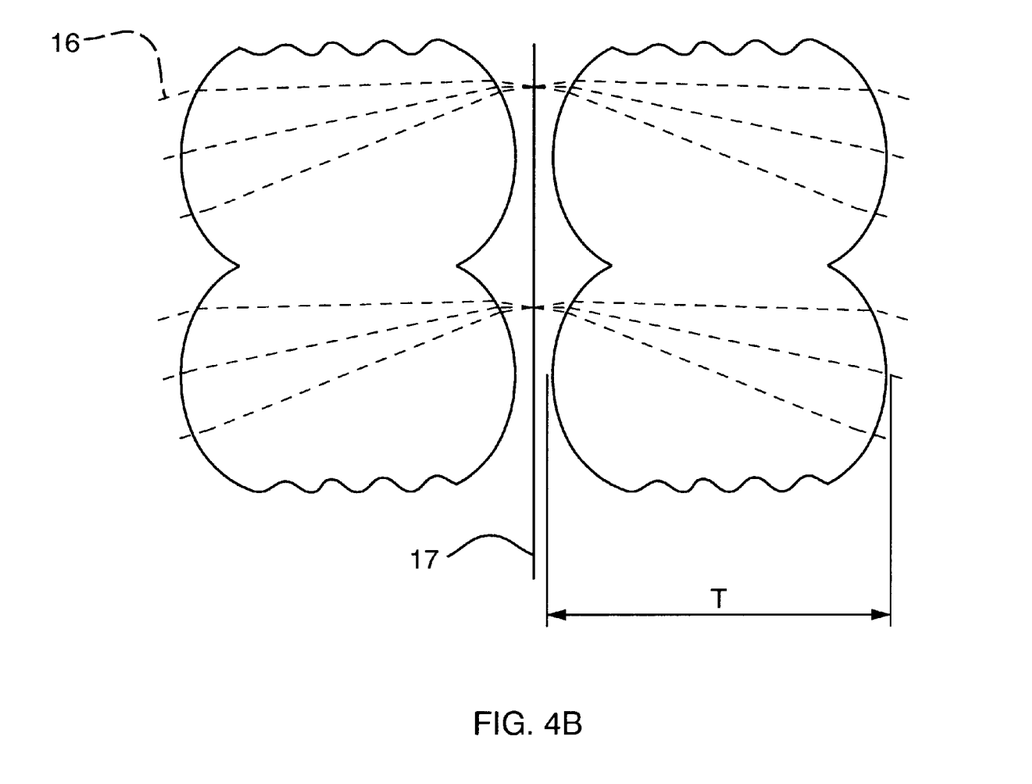
Figure 4C:
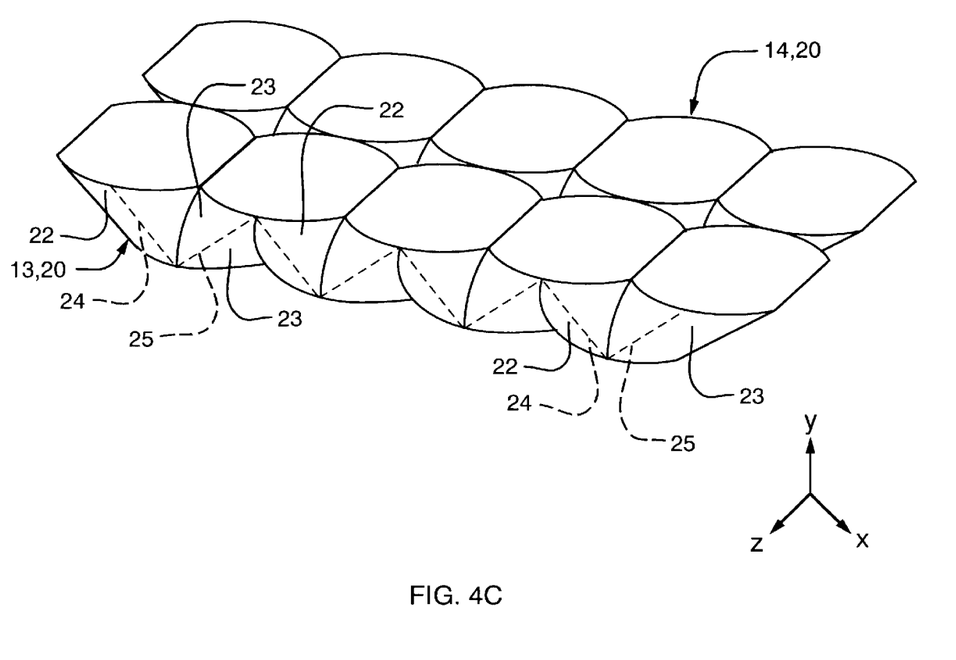

FIG. 4a, FIG. 4b and FIG. 4c depict another embodiment of a device for optical beam transformation according to the invention. Instead of one array of cylindrical lenses, two arrays of cylindrical lenses 13, 14 are used in this case; here, too, the x-y-planes are provided with arrays of segments of cylindrical lens 15 arranged at an angle of 45°. FIG. 4b shows, however, that these, arrays of cylindrical lenses 13, 14 have a smaller thickness T; here the thickness of each individual array of cylindrical lenses 13, 14 can be chosen smaller than the single focal length $F_n$. This is illustrated by the schematic drawing FIG. 4b. Here it is shown that each of the arrays of cylindrical lenses 13, 14 comprises a number of biconvex cylindrical lenses with identical focal lengths so that bundles of parallel rays incident from the left or from the right are focused onto a common focal plane 17 located between the arrays of cylindrical lenses 13, 14. Because of the fact that the light rays entering the second array of cylindrical lenses 14 all depart from a focal point in the common focal plane 17 the efficiency of the optical beam transformation is increased, because the extension of the light source in focal plane 17 is smaller than the extension of the beam incident upon the entry plane of the array of cylindrical lenses 13 from cylindrical lens 2. Such a device for optical beam transformation allows to handle light sources with greater divergence or light sources with light emitting sections that are more closely spaced in x-direction or linear or two-dimensionally extended light sources in a more effective way, so that losses can be reduced.

Figure 5A:
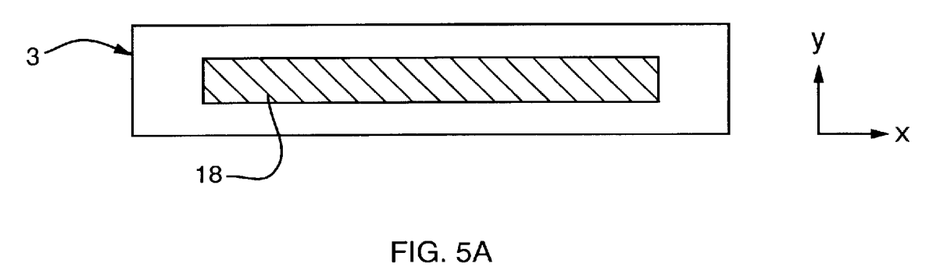
FIG. 5a is a plan view of the entry plane of a device according to the invention upon which the light from a two-dimensionally extended light source is incident.
Figure 5B:
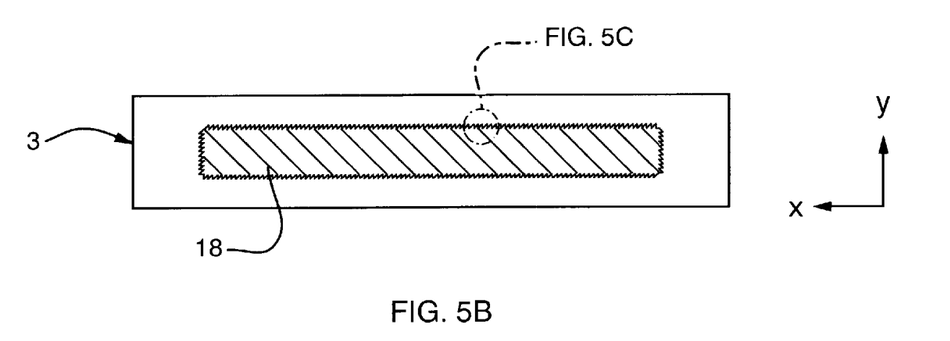
Figure 5C:
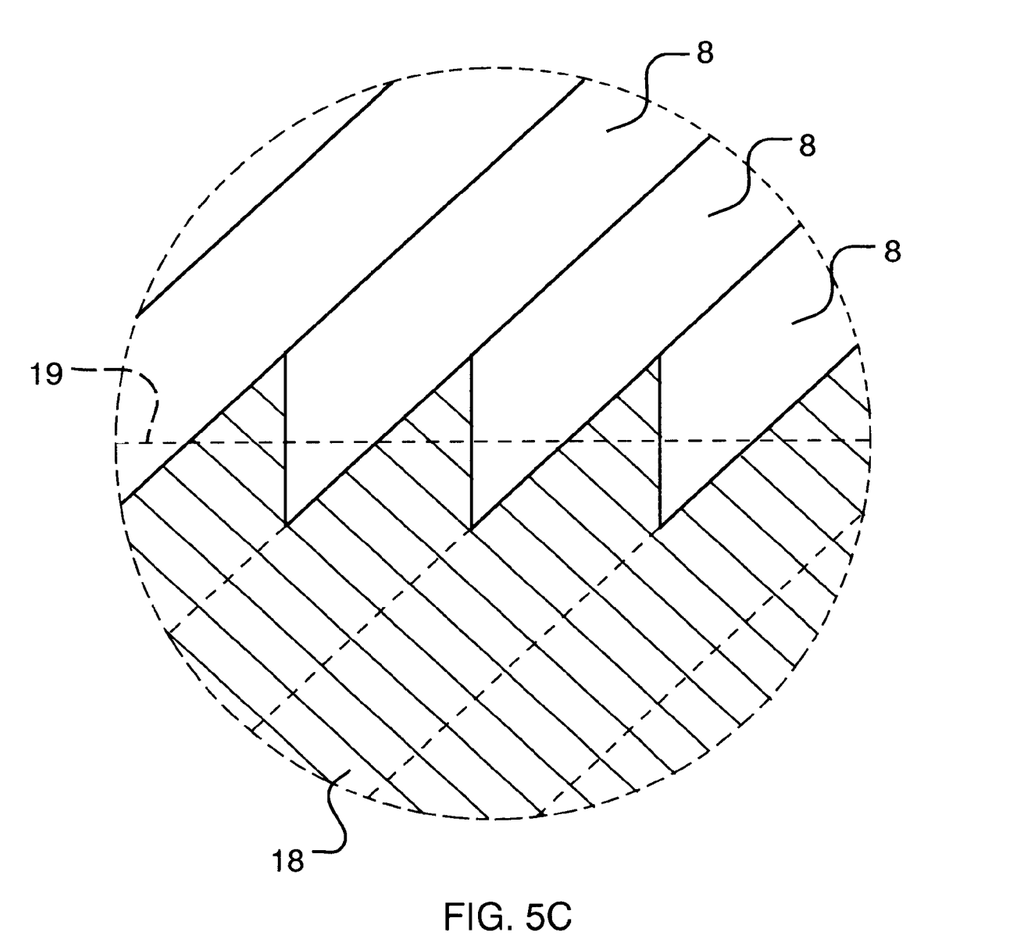
FIG. 5c is an enlarged detail according to the circle FIG. 5c in FIG. 5b.

FIG. 5a, FIG. 5b and FIG. 5c show the passage through a device 3 according to the invention of a beam of light 18 which is incident upon device 3 with a two-dimensional cross-section. FIG. 5a shows the entry of the beam of light 18 with a two-dimensional cross section into the x-y-plane on the entry side of device 3, while FIG. 5b shows the exit of the beam of light with two-dimensional cross-section from the x-y-plane on the exit side of device 3. As seen in the enlarged detail in FIG. 5c, the beam of light 18 is rotated by 90° in segments during its passage through device 3 or, in other words, it is reflected in lines that are at right angles to the cylinder axes of the segments of cylindrical lens 8. The dashed line 19 in FIG. 5c illustrates the limit at the margin of the beam of light 18 with two-dimensional cross-section that is incident upon the entry side, while the solid lines represent the outline of the beam of light 18 with two-dimensional cross-section as it emerges on the exit side. If device 3 is segmented finely enough by segments of cylindrical lens 8, the two-dimensional cross-section of the incident beam of light 18 will fray out only lightly at its margins due to its passage through device 3. In spite of that the complete cross-sectional area of the beam of light 18 with two-dimensional cross-section is rotated in segments or, in other words, is reflected in lines which are at right angles to the cylinder axes of the segments of cylindrical lens 8.

Figure 6A:
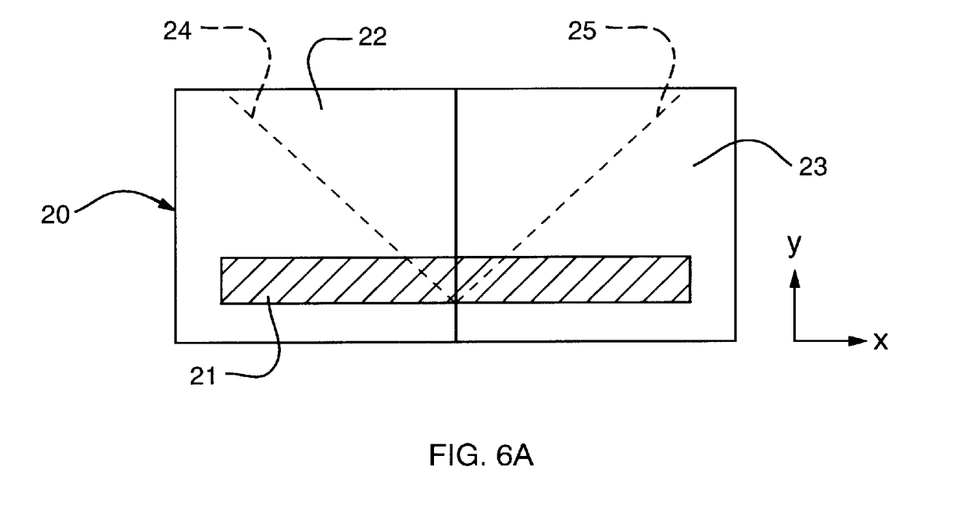
FIG. 6a is a plan view of the entry plane of another embodiment of a device according to the invention upon which the light from a two-dimensionally extended light source is incident.
Figure 6B:
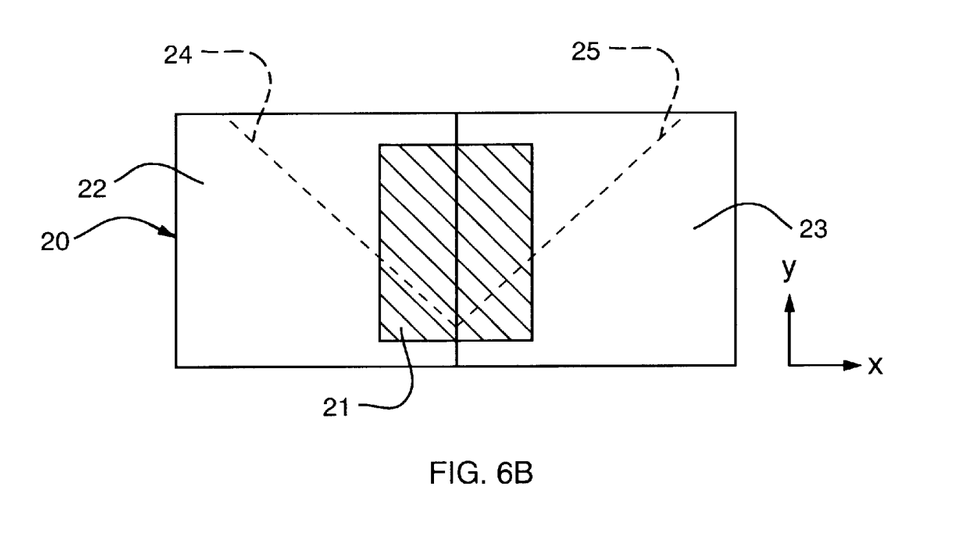

FIG. 6a and FIG. 6b show another embodiment of a device 20 for optical beam transformation according to the invention. FIG. 6a depicts the x-y-plane on the entry side of device 20, upon which the beam of light 21 with two-dimensional cross-section is incident. The segments of cylindrical lens 22, 23 on the x-y-plane on the entry side of device 20 are not arranged in parallel to each other, as in the device 3 described above, but at right angles to each other. The apex lines 24, 25 of segments of cylindrical lens 22, 23 are represented as dashed FIGS. 6a and 6b. It is also possible to arrange the segments of cylindrical lens 22, 23 at an angle that is not a right angle.

As in device 3 according to FIG. 2c, the axis of the segment of cylindrical lens 23 depicted on the right hand side in FIG. 6a forms an angle α of 45° with the base side extending in x-direction of device 20, which may for example be cuboid. In the case of the segment of cylindrical lens 22 depicted on the left hand side in FIG. 6a the axis of the segment of cylindrical lens 22 forms an angle α of −45° with the base side extending in x-direction of device 20, which may for example be cuboid.

FIG. 6b shows that the outline of the beam of light 21 has been changed by its passage through device 20. In the case of the segment of cylindrical lens 22 depicted on the left hand side in FIG. 6a and FIG. 6b, that part of the beam of light incident upon this segment of cylindrical lens 22 is rotated by +90°, whereas that part of the beam of light incident upon the segment of cylindrical lens 23 is rotated by −90°. As a consequence a beam of light 21 which before its passage through device 20 was relatively extended in one direction, namely the x-direction, and was relatively narrow in another direction, namely the y-direction, emerges as a beam of light, which is in one direction, namely the y-direction, half as extended as previously in x-direction and which is in the other direction, namely the x-direction, twice as wide as previously in y-direction. In contrast to the embodiment shown in FIG. 2, in which according to FIG. 3 the beams of light 10, 11, 12 that are being rotated by 90° undergo separation, the individual sections of beam of light 21, which are incident upon different segments of cylindrical lens 22, 23, are being folded towards each other, such that after passage through device 20 the distance in x-direction between the sections incident upon individual segments of cylindrical lens 22, 23 is reduced to zero. Because of this feature device 20 is particularly useful for focussing multi-mode diode lasers onto optical fibers of for example 20 μm diameter.

In the case of the device 20 according to FIG. 6a and FIG. 6b the center of rotation, about which the individual sections of the beam of light 21 are rotated, may be chosen freely by arbitrarily shifting the two apex lines 24, 25 in y-direction.

What is claimed is:

1. An optical beam transformation system, comprising:
   at least one light source that is capable of emitting at least one beam of light, each said beam of light having a direction of propagation;
   an optical beam transformation device comprising two or more segments of cylindrical lenses, each of said segments having a substantially equal focal length (Fn), wherein said segments are arranged adjacent to each other, said segments are arranged at right angles to each other, and wherein said segments provide at least one entry plane and/or at least one exit plane for said beam of light;
   an imaging element to at least partially pass said at least one beam of light emitted by said at least one light source onto said optical beam transformation device, wherein said optical beam transformation device rotates said beam of light about said direction of propagation by an angle of about 90 degrees, and wherein said beam of light incident upon said optical beam transformation device has a linear or a rectangular cross-section and that a cylinder axis of said segment of cylindrical lens is at an angle with respect to a longitudinal direction of said linear or rectangular cross-section of said beam of light within said entry or exit plane at an angle of about 45 degrees.

2. The system of claim 1 further comprising one or more focusing elements that focus said beam of light onto a front face of an optical fiber.

3. The system of to claim 1 wherein said focusing elements is a cylindrical lens.

4. The system of to claim 1, wherein said at least one light source is selected from the group comprising linear light sources, point light sources, or two-dimensionally extended light sources.

5. An optical beam transformation device, comprising:

at least one entry plane and/or exit plane on said device through which one or more beams of light pass, wherein said beams of light have a direction of propagation and wherein said device rotates said beams by approximately 90 degrees, and wherein said entry plane or said exit plane are substantially elongated having a longitudinal direction;

two or more adjacent segments of cylindrical lenses having a cylinder axis, wherein said cylindrical axis of each said segment is angled at a substantially 45 degrees angle with respect to said longitudinal direction of said entry plane or said exit plane, wherein said segments are disposed such that said segments face each other in the direction of said propagation of said beam of light passing through said segment, said segments are arranged at right angles to each other, and wherein said segments have substantially equal focal length ($F_n$).

6. The optical beam transformation device of claim 5, wherein said device is substantially cuboid in design with said entry plane and said exit plane substantially parallel to each other, wherein a distance between said entry plane and said exit plane is approximately equal to twice a focal length of said segments of said cylindrical lenses.

7. The device of claim 5, wherein said device comprises two substantially cuboid bodies each of said bodies having said entry plane and said exit plane substantially parallel to each other, wherein the distance between said entry exit and exit plane being less than a single focal length of said segments of cylindrical lens.

* * * * *